METHOD FOR ETCHING CURVED SURFACES

Filed Aug. 4, 1965 2 Sheets-Sheet 1

WORKPIECE CYCLE OF MOTION
IN SIDE ELEVATION

INVENTOR.
Clayton W. Hoornstra

BY John M. [signature]
ATTORNEY

METHOD FOR ETCHING CURVED SURFACES

Filed Aug. 4, 1965 2 Sheets-Sheet 2

INVENTOR.
Clayton W. Hoornstra
BY John M. DeMeier
ATTORNEY

United States Patent Office 3,510,372
Patented May 5, 1970

1 2

3,510,372
METHOD FOR ETCHING CURVED SURFACES

Clayton W. Hoornstra, Midland, Mich., assignor to The Dow Chemical Company, Midland, Mich., a corporation of Delaware Filed Aug. 4, 1965, Ser. No. 477,130
Int. Cl. C23f *1/02;* B41c *1/18*
U.S. Cl. 156—14 11 Claims

ABSTRACT OF THE DISCLOSURE

In the powderless etching of curved plates, by impinging thereon a liquid etching composition, distorted shoulders of images are avoided by the improvement of cyclically varying, continuuosly or stepwise, the angle between the axis of curvature of the curved plate and the flight path of impinging etching composition, while rotating the curved plate on its axis, until the desired depth of etch is attained. The cycles may vary from about 0.5 to 30 seconds in duration and the angle values may be selected from a range of extremes of 10 and 170 degrees to 80 and 100 degrees. Discontinuous cyclic change is carried out by alternatively varying the flight path of the etching composition. Continuous variations during the cyclic change are typically obtained by directing the etching composition along an unchanging flight path while oscillating the axis of the curved plate with respect to the source of the etching composition.

Figure 1:
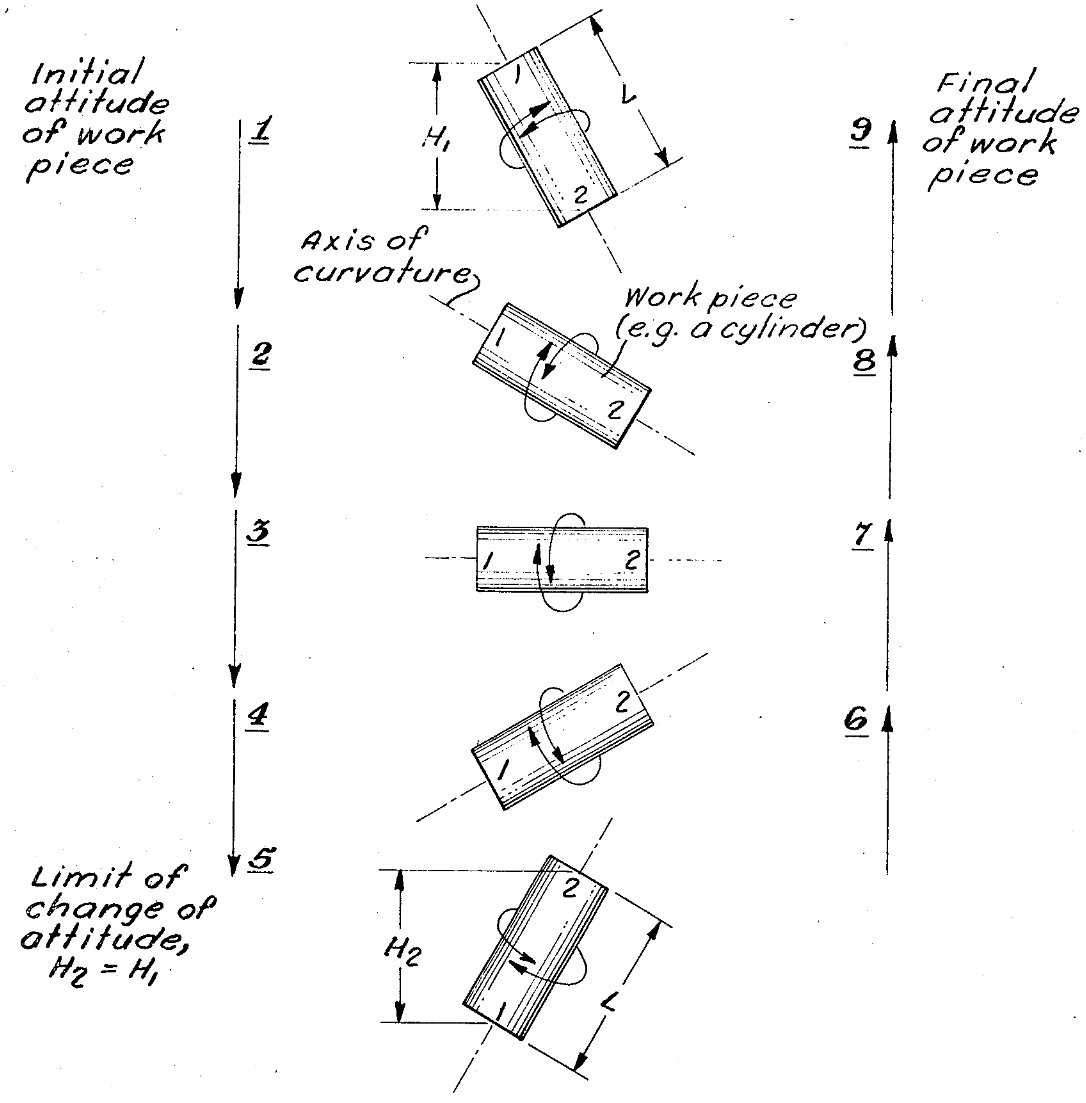

This invention relates to etching curved surfaces including, particularly, curved metal surfaces to obtain thereon in relief an image pattern of comparable quality to that obtained in etching flat surfaces. Specifically, the present invention is directed to a method of etching curved plates in the photoengraving art.

In etching metal by the widely used and so-called powderless etching process, the entire surface of the workpiece is first coated with a material such as, for example, chromated polyvinyl alcohol (PVA) which when exposed to a light image is insolubilized and where not so-exposed is readily removed by a suitable solvent. The insolubilized coating is cured by heat, and the uncoated or non-image areas are chemically or mechanically cleaned of residue. The workpiece surface so prepared is contacted with an etching bath, for example, by splashing or spraying the bath upon the work. Said bath generally contains an acid etchant suitable for dissolving the workpiece metal, and a film forming agent or agents and may also contain certain organic liquid solvents and other additive agents for modifying the behavior of the bath. The latter step is continued until the desired extent of relief is obtained. The workpiece is removed from contact with the etching bath, rinsed and dried and is useful as a photoengraved plate from which mats can be prepared to ultimately produce molded rotary plates or by which direct printing may be accomplished.

In general, the quality of printed matter is directly related to the quality of the photoengraved plate. For a high quality plate acceptable to the printing trade the original matter must therefore be reproduced with maximum fidelity in the relief plate. A high quality plate is characterized by a uniform outward-sloping sidewall or "shoulder" around the periphery of each image element. The slope of the shoulder can be expressed in terms of the angle formed between the shoulder and a line normal, i.e., perpendicular, to the image surface. Said angle is herein called the "shoulder angle." The shoulder angle is conveniently found by first measuring the horizontal width "W" of the shoulder between the image margin and the shoulder base and then measuring the vertical depth "D" of relief adjacent to the shoulder by means of suitable instruments. The ratio of "W" to "D" is the tangent of the "shoulder angle" and the angle is determined from tangent values. The difference between the shoulder angle measured in the direction of curvature and that measured in the axial direction (at right angles to the direction of curvature) provides a quantitative index of the degree of shoulder distortion present on an engraved cylindrical surface. An ideal shoulder angle difference is about 0°, while an acceptable shoulder angle difference is from about 0° to about 10°. An unacceptable shoulder angle difference on the other hand is one which exceeds about 10°.

The art of etching on flat surfaces is developed to the point where such high quality results may consistently be obtained. In etching on curved surfaces or plates, however, by processes heretofore known to the art, serious distortion of the relief image has been encountered, and the plates so produced have little or very limited use in commercial operations. First, the image shoulders produced on curved surfaces by processes heretofore known and used are inordinately broad or elongated in circumferential directions, that is, in the direction of curvature of the plate, and are inordinately narrow in the axial direction or even slope inward so that two sides of the image element are actually undercut or undermined and etched away. When inordinately elongated shoulders extend into the non-image areas in the direction of plate curvature from the boundaries of light halftone image areas, the effect or defect is known variously in the vernacular of the trade as "tailing," "runaround," "rundown" or "bleed-off." Secondly in the known art processes for etching of curved plates another phenomenon called "channelling" is also encountered which involves formations of circumferentially directed channels or grooves in the plate between image areas.

A number of processes have been developed which purport to produce on curved surfaces a relief image of comparable quality to that commonly obtained on flat surfaces, and machines are commercially available for carrying out these processes. However, none of these processes or machines have actually accomplished this result, but rather, all produce curved engravings having a distorted asymmetric relief to a greater or lesser extent as described.

In the most commonly used prior art processes the curved workpiece, for example a cylinder, is held with its axis of curvature horizontal and is rotated about said axis while being impinged by portions of an etching bath. The etching bath is generally stored in a sump spaced below the workpiece and is propelled up to the plate by suitable means such as by rotating paddles. One variation of the above process differs only in that the workpiece is simultaneously and further rotated in a horizontal plane about a vertical axis. In both the above processes the axis of curvature of the workpiece remains horizontal throughout the etching step, and etching bath incidence on the workpiece is in a substantially upward and vertical direction. However, this does not completely eliminate the aforementioned difficulties, nor produce a photoengraving plate of a quality near that of a flat plate.

It is the principal object of the present invention, therefore, to provide a novel process for etching on curved surfaces whereby the aforementioned difficulties and defects associated with curved surface etching are avoided and wherein the result attained is of comparable quality to that of etching flat surfaces.

Another object of the present invention is to provide a method of etching curved plates wherein the problems of non-uniformity of image shoulder width and slope, of "tailing" and of "channelling" are essentially eliminated and commercially usable photoengraved curved plates are produced.

Figure 2:
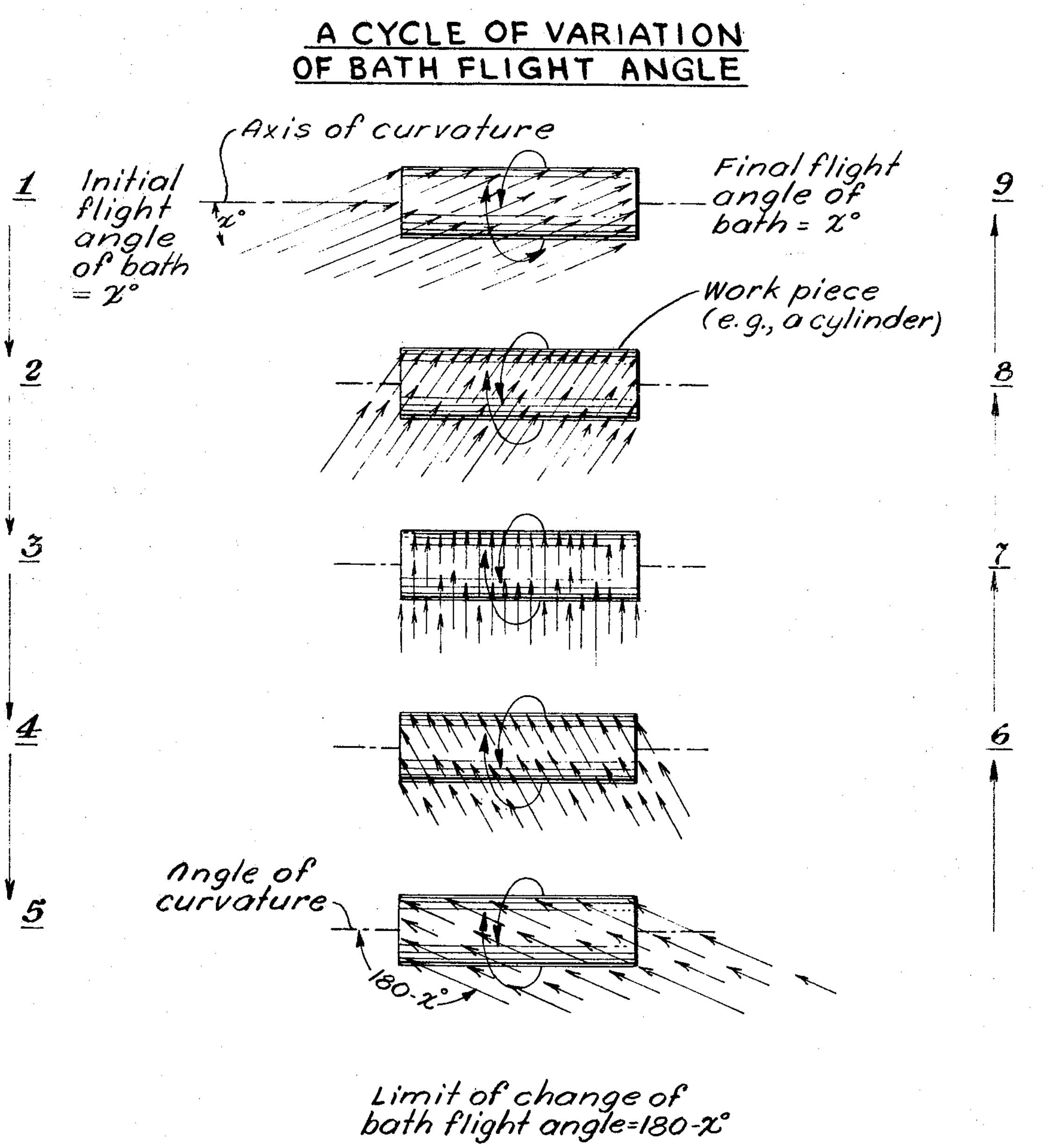

The present invention will more readily be understood from the following detailed description thereof, especially when read in conjunction with the appended drawings wherein:

FIG. 1 is a diagrammatic view of one embodiment of the rotational and cyclic motion of a curved workpiece and holder as it proceeds through the cycle of action, as visually indicated, relative to a fixed direction of impingement of etchant; and FIG. 2 is a diagrammatic view of another embodiment of the invention showing rotation of a horizontally disposed curved workpiece about a fixed horizontal axis, that is, its axis of curvature, while etchant is impinged against it during each predetermined cycle from various directions as indicated, relative to the disposition of said workpiece.

In accordance with the present invention, I have found generally that the above and other objects and advantages can be obtained in etching a curved surface by programming the motion of the workpiece and/or the directions of application of the liquid etching composition on the workpiece to provide substantially like flows in substantially all directions across each point on the workpiece surface during the etching step. More specifically, the present novel process involves the steps of applying a resist image to a curved surface, impinging a liquid etching composition against said surface, simultaneously rotating the workpiece about its axis of curvature, while cyclically varying the angle between said axis and the flight path of the impinging etching composition. This may be accomplished by (a) cyclically varying of the axis of curvature of this rotating workpiece relative to the flight of the impinging etching composition, and/or (b) cyclically varying the angle of flight of said etching composition relative to said axis of curvature, in a repeated time cycle thereby providing a repeated sequence of flows in essentially all directions across each point on the workpiece surface, and continuing the cyclic operation until the desired depth of relief is attained. The plate after etching is normally washed and dried. A high quality etched curved product with shoulders of uniform width and without "tailing" or "channelling" is obtained, which heretofore was only obtainable on etched flat surfaces.

The terms "cycle, cyclic, or cyclically" as used herein are in reference to a repeated program of movement of either an object such as a curved workpiece, or, of a flight path of increments of etching bath liquid, or both.

With reference now to the drawings, FIG. 1 is a generalized illustration of one basic embodiment of the process of the present invention wherein, while being etched, the curved workpiece is repeatedly moved through a cycle of motion wherein initially a first end of the workpiece lies a given maximum vertical distance above or below the second end thereof and the vertical disposition of the two ends with respect to one another is reversed twice to restore the original vertical spatial relationship between the two ends while simultaneously the workpiece is rotated about its axis of curvature. Where L is the axial length from end-to-end of the workpiece and H is the maximum vertical distance between the ends of the workpiece (at its axis of curvature) that is attained during said motion cycle of the workpiece, H may be between 0.4L and 1L. I prefer that H be between 0.7L and 1L. Said motion cycle may be repeated between 2 and 20 times per minute; I prefer that it be repeated between 4 and 10 times per minute. In this embodiment of the process the angle or angles of flight of the increments of the etching bath relative to the horizon are preferably maintained constant during etching.

An example of apparatus suitable for carrying out the foregoing described operations according to the method of the invention is shown in U.S. Pat. 3,351,077, the disclosure of which is expressly incorporated herein by reference.

FIG. 2 illustrates another basic embodiment of the process of the present invention wherein, while being etched, the curved workpiece is rotated about its axis of curvature while said axis remains horizontal and while the angle between the flight path of the impinging increments of etching bath and said axis of curvature is cyclically varied between X° and 180°$-X$° where X may be between 10° and 80°; I prefer that X be between 10° and 40°. The said cycle of variation in the angle of flight of increments of the etching bath may be repeated between 0.5 and 120 times per minute; I prefer that said cycle be repeated between 4 and 60 times per minute.

Another basic embodiment of the process, not shown in the accompanying drawings, of the present invention wherein the axis of curvature of the workpiece is held horizontal and the workpiece rotates about said axis whereby each given point on the workpiece surface beginning at the zenith of its circular path passes successively through four 90° quadrant etching zones and is impinged by increments of etching bath incident at the following angles relative to said axis:

| | |
|---|---|
| In the first zone | X° |
| In the second zone | 180$-X$° |
| In the third zone | X° |
| In the fourth zone | 180$-X$° |

X may be between 10° and 80°; I prefer that X be between 10° and 40°.

In all the embodiments described above the peripheral speed of the workpiece as it rotates about its axis of curvature may be between 70 and 250 feet per minute; I prefer that it be between 140 and 200 feet per minute. The direction of the latter rotation may be reversed between 0 and 60 times per minute; I prefer that it be reversed between 5 and 30 times per minute. At least one full rotation must occur before reversal however.

The following actual examples employing the preferred embodiment described in conjunction with FIG. 1 serve to further illustrate the present novel process. It is not intended, however, that the invention be limited in any way thereto as to scope.

EXAMPLE I

An image pattern including lines of equal width running axially and circumferentially was applied, by methods hereinbefore described, to a cylinder of photoengraving grade magnesium alloy 8 inches in diameter by 18 inches long. This cylinder was then etched for 10 minutes in accordance with the process above. H was substantially 0.71L=0.71(18)=12.6 inches. The vertical motion cycle of the ends of the cylinder was repeated 9 times per minute. The peripheral speed of the cylinder was 125 feet per minute as it rotated about its axis of curvature. The direction of the latter rotation was reversed 5 times per minute. A magnesium etching bath in accordance with U.S. Pat. 3,023,138 was prepared and splashed upon the workpiece from a sump generally underlying the workpiece by means of an array of rotating vaned paddles. The direction of flight of the splash was invariant during the etching step. The temperature of the bath was maintained between 61 and 71° F.

The plate was removed, rinsed and dried. The depth of relief was .027 inch. The angles of the shoulders extending in the direction of curvature from the axial line image measured 43.5°. The angle of the shoulders extending axially from the circumferential line image likewise measured 43.5°. Thus, there was no shoulder distortion, and the engraving was of a high quality suitable for use in critical commercial operations.

COMPARATIVE

The above process was repeated in every particular except that H remained zero at all times. The etch was .026 inch deep. "Tails" of spurious shoulder encroached into the non-image area in the direction of plate curvature from the borders of light halftone areas. The average shoulder angle of the shoulders extending in the direction of plate curvature was 43°, while the average shoulder angle of the shoulders extending in the axial direction was 22°, less than half the former. In certain areas of the image the shoulder angle of the axial shoulders was 0° (vertical sidewall). This plate was not suitable as a quality etched curved plate.

The present invention can be modified and changed without departing from the spirit or scope thereof, and the present invention is only limited as defined in the appended claims.

I claim:

1. A method for etching curved plates which comprises: applying a resist image to a curved surface as a workpiece, impinging a liquid etching composition against said surface, simultaneously rotating the workpiece about its horizontal axis of curvature, while cyclically varying the angle of the flight path of the impinging etchant relative to said axis of curvature in a repeated time cycle between X° and 180°−$X$° wherein X° is between about 10° and 80° thereby providing a repeated sequence of flows in essentially all directions across each point on the workpiece surface, continuing the rotation and cyclic motion until the desired depth of etch is attained, and rinsing the plate so-etched.

2. The method of claim 1, wherein in the cycle of motion, X is between 10° and 40°.

3. A method for etching curved plates which comprises: applying a resist image to a curved surface as a workpiece, impinging a liquid etching composition against said surface, simultaneously rotating the workpiece about its axis of curvature, while cyclically varying the angle of the axis of curvature of the rotating workpiece relative to the flight path of the impinging etching composition in a repeated time cycle to provide a repeated sequence of flow in essentially all directions across each point on the workpiece surface, said angle being cyclically varied between X° and 180°−$X$° wherein X° is between about 10° and 80°; continuing the rotation and cyclic motion until the desired depth of etch is attained, and rinsing the plate so-etched.

4. The method of claim 3, wherein the cycle of motion of the angle between said axis and the flight path of etchant is repeated from about 2 to 20 times per minute.

5. The method of claim 3, wherein the rotational speed of the workpiece about its axis of curvature is from about 70 to about 250 feet per minute.

6. The method of claim 3, wherein the rotation of the workpiece about its axis of curvature is reversed up to about 60 times per minute.

7. The method of claim 3, wherein the cycle of motion comprises a repeated movement of the workpiece having a length L wherein initially a first end of the workpiece lies a given maximum vertical distance H from the second end thereof, and the vertical disposition of the two ends with respect to one another is reversed twice to restore the original distance H between the two ends while simultaneously rotating the curved surface about its axis of curvature.

8. The method of claim 7, wherein the distance H may range from about 0.4L to about 1.0L.

9. The method of claim 7, wherein the distance H may range between about 0.7L and 1.0L.

10. A method of etching curved plates which comprises: applying a resist image to a curved surface as a workpiece; rotating said curved workpiece horizontally about its axis of curvature; passing any given point on the curved surface of the workpiece beginning at the zenith of its circular rotational path successively through four 90° quadrant etching zones; impinging said curved surfaces with increments of etching bath incident thereto at the following angles relative to said axis:

| | |
|---|---|
| In the first zone | X° |
| In the second zone | 180−$X$° |
| In the third zone | X° |
| In the fourth zone | 180°−$X$ |

wherein X° is from about 10° to about 80°; continuing said rotating and impinging until the desired depth of etch is attained, and rinsing the plate so-etched.

11. The method of claim 10, wherein X° is from about 10° to about 40°.

References Cited

UNITED STATES PATENTS

| | | | |
|---|---|---|---|
| 3,108,031 | 10/1963 | Hasala et al. | 156—345 |
| 3,351,077 | 11/1967 | Hoornstra | 134—147 |

JACOB H. STEINBERG, Primary Examiner

U.S. Cl. X.R.

156—6, 345